United States Patent
Schuba et al.

(10) Patent No.: US 8,064,606 B2
(45) Date of Patent: Nov. 22, 2011

(54) METHOD AND APPARATUS FOR SECURELY REGISTERING HARDWARE AND/OR SOFTWARE COMPONENTS IN A COMPUTER SYSTEM

(75) Inventors: Christoph L. Schuba, Mountain View, CA (US); James P. Hughes, Palo Alto, CA (US); Daniel E. Smith, Brisbane (AU)

(73) Assignee: Oracle America, Inc., Redwood Shores, CA (US)

(*) Notice: Subject to any disclaimer, the term of this patent is extended or adjusted under 35 U.S.C. 154(b) by 1043 days.

(21) Appl. No.: 11/939,416

(22) Filed: Nov. 13, 2007

(65) Prior Publication Data

US 2009/0122988 A1    May 14, 2009

(51) Int. Cl.
| | |
|---|---|
| H04L 9/00 | (2006.01) |
| G06Q 30/00 | (2006.01) |
| G06F 21/00 | (2006.01) |
| H04L 9/14 | (2006.01) |
| H04L 29/06 | (2006.01) |
| H04M 1/68 | (2006.01) |

(52) U.S. Cl. ............ 380/277; 380/44; 705/14; 705/55; 705/59; 713/171

(58) Field of Classification Search ............. 380/277, 380/44; 705/14, 55
See application file for complete search history.

(56) References Cited

U.S. PATENT DOCUMENTS

2003/0149670 A1 * 8/2003 Cronce ..................... 705/59
2004/0143492 A1 * 7/2004 Howell et al. ............. 705/14

FOREIGN PATENT DOCUMENTS

WO   WO2007111660 A2 * 10/2007

OTHER PUBLICATIONS

Bahie-Eldin, M.A.; Omar, A.A.;"Complexity measure of encryption keys used for securing computer networks"; Computer Security Applications Conference, 1998, Proceedings., 14th Annual Digital Object Identifier: 10.1109/CSAC.1998.738645 Publication Year: 1998, pp. 250-255.*

* cited by examiner

*Primary Examiner* — Eleni Shiferaw
*Assistant Examiner* — Courtney Fields
(74) *Attorney, Agent, or Firm* — Park, Vaughan, Fleming & Dowler LLP

(57) ABSTRACT

A system that securely registers components in a first system is presented. During operation, the first system receives a request from an intermediary system to obtain configuration information related to the components in the first system. In response to the request, the first system: (1) encrypts configuration information for the first system using a first encryption key; (2) encrypts the first encryption key using a second encryption key; and (3) sends the encrypted configuration information and the encrypted first encryption key to the intermediary system so that the intermediary system can forward the encrypted configuration information and the encrypted first encryption key to the second system, whereby the encrypted configuration information is cryptographically opaque to the intermediary system. Next, the second system uses the configuration information to register the components in the first system.

23 Claims, 17 Drawing Sheets

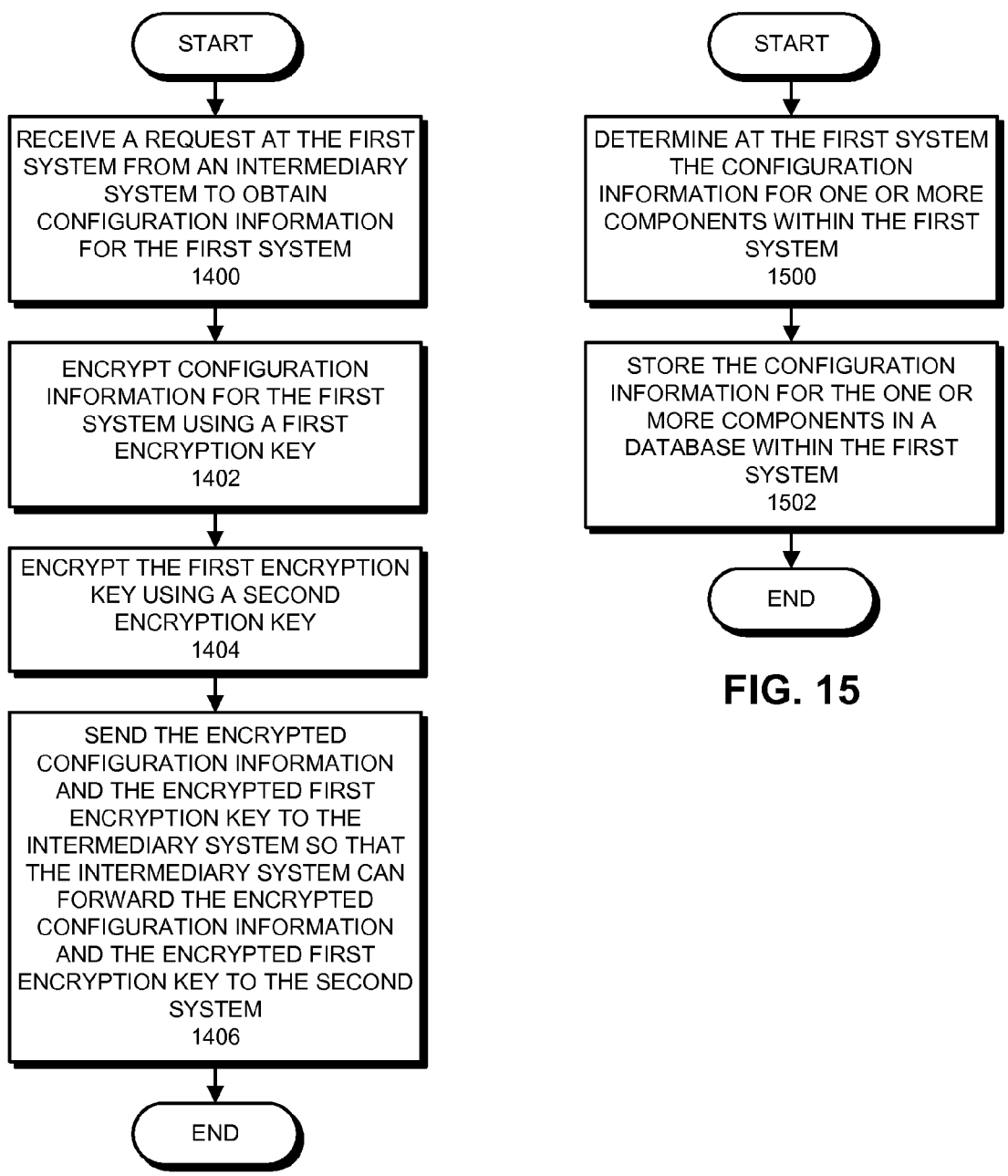

METHOD AND APPARATUS FOR SECURELY REGISTERING HARDWARE AND/OR SOFTWARE COMPONENTS IN A COMPUTER SYSTEM

BACKGROUND

1. Field of the Invention

The present invention relates to techniques for obtaining configuration information from a computer system. More specifically, the present invention relates to a method and apparatus for securely registering hardware and/or software components in a computer system.

2. Related Art

As the number of computer systems used by an organization increases, it becomes progressively harder to perform system maintenance operations for these computer systems. One of the tasks involved in maintaining a computer system is to obtain configuration information for the computer system. For example, this configuration information can include information about software and hardware components installed in the computer system. Moreover, this configuration information can be used to perform maintenance tasks such as: offering initialization information to the computer system; registering any software, firmware, and hardware component with the computer system; offering software and firmware patches; or offering replacements for outdated hardware components.

To obtain this configuration information, a system administrator typically uses a computer system belonging to the administrator to remotely request configuration information for one or more target computer systems. During this process, it is desirable to require minimal interaction with a system administrator or the target systems. However, at the same time there is a need to prevent unauthorized users or systems from viewing the configuration information.

Hence, what is needed is a method and an apparatus for securely registering hardware and software components in a computer system.

SUMMARY

Some embodiments of the present invention provide a system that securely registers components in a first system. During operation, the first system receives a request from an intermediary system to obtain configuration information related to the components in the first system. In response to the request, the first system: (1) encrypts configuration information for the first system using a first encryption key; (2) encrypts the first encryption key using a second encryption key; and (3) sends the encrypted configuration information and the encrypted first encryption key to the intermediary system so that the intermediary system can forward the encrypted configuration information and the encrypted first encryption key to the second system, whereby the encrypted configuration information is cryptographically opaque to the intermediary system. Note that the term "cryptographically opaque" means that a system without a security credential associated with the cryptographically opaque configuration information cannot access the configuration information. Next, the second system uses the configuration information to register the components in the first system. In some embodiments, the first system is an end host system, the second system is a server (e.g., a sever which receives configuration information for computer systems from one or more intermediary systems), and the intermediary system is a service tag registration client. These systems are described in more detail below.

In some embodiments, the configuration information can include one or more of: a version number of one or more software packages installed on the first system; a version number of one or more hardware components installed on the first system; serial numbers for hardware components; serial numbers for software components; an operating system version number; firmware version numbers for hardware components; runtime instances of software components; and any other configuration information for a system.

In some embodiments, the first encryption key is a session key generated by the first system.

In some embodiments, a new session key is generated for each request from an intermediary system to obtain configuration information.

In some embodiments, the session key is a symmetric encryption key.

In some embodiments, the second encryption key is a public encryption key for second system.

In some embodiments, prior to encrypting the configuration information for the first system, the first system determines the configuration information for one or more components within the first system. The first system then stores the configuration information for the one or more components in a database within the first system.

In some embodiments, the components can include one or more of: hardware components; and software components.

In some embodiments, prior to encrypting configuration information, the first system compresses the configuration information.

In some embodiments, the second system receives the encrypted configuration information and the encrypted first encryption key at the second system. Next, the second system uses a third encryption key for the second system to decrypt the encrypted first encryption key. The second system then uses the decrypted first encryption key to decrypt the encrypted configuration information.

In some embodiments, the second encryption key is a public encryption key for the second system and third encryption key is a private encryption key associated with the second encryption key.

In some embodiments, the second system stores the decrypted configuration information in a database within the second system.

In some embodiments, prior to responding to the request from the intermediary system, the first system receives a public encryption key for the intermediary system. The first system then determines whether a public encryption key for another intermediary system has already been received.

In some embodiments, if the public encryption key for another intermediary system has already been received, the first system determines whether the public encryption key for the intermediary system matches an already-received public encryption key for another intermediary system. If so, the first system determines that the intermediary system has already been associated with the first system.

In some embodiments, if the public encryption key for the intermediary system does not match an already-received public encryption key for another system and if the intermediary system is a valid intermediary system, the first system determines that a rogue intermediary system was inappropriately associated with the first system. The first system then performs a remedial action.

In some embodiments, if the public encryption key for another intermediary system has not been received, the first system stores the public encryption key for the intermediary system. The first system then associates the intermediary system with the first system.

In some embodiments, the first system receives a request for the first encryption key from the intermediary system. In response to the request, the first system: (1) encrypts the first encryption key using a public encryption key for the intermediary system; and (2) sends the encrypted first encryption key to the intermediary system. The intermediary system receives the encrypted first encryption key and: (1) uses a private encryption key for the intermediary system to decrypt the encrypted first encryption key; and (2) decrypts the encrypted configuration information using the decrypted first encryption key.

In some embodiments, if the configuration information is compressed, the second system decompresses the decrypted compressed configuration information.

BRIEF DESCRIPTION OF THE FIGURES

FIG. 14 presents a flow chart illustrating the process of securely sending configuration information for a first system to a second system in accordance with an embodiment of the present invention.

FIG. 15 presents a flow chart illustrating the process of obtaining configuration information at the first system in accordance with an embodiment of the present invention.

DETAILED DESCRIPTION

Figure 1:
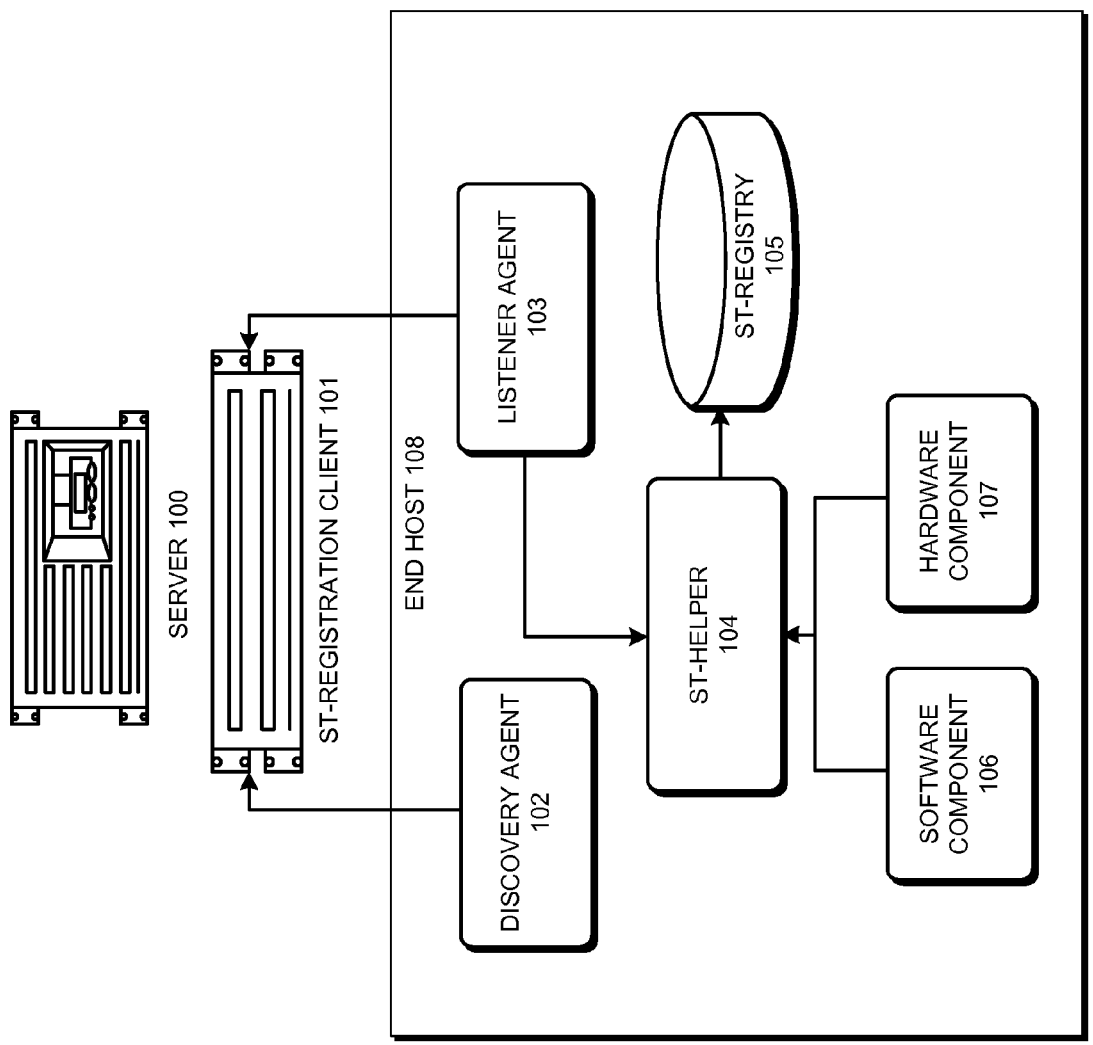
FIG. 1 presents a block diagram illustrating a server, a service tag registration client (ST-registration client), and an end host in accordance with an embodiment of the present invention.

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein.

The data structures and code described in this detailed description are typically stored on a computer-readable storage medium, which may be any device or medium that can store code and/or data for use by a computer system. This includes, but is not limited to, volatile memory, non-volatile memory, magnetic and optical storage devices such as disk drives, magnetic tape, CDs (compact discs), DVDs (digital versatile discs or digital video discs), or other media capable of storing computer readable media now known or later developed.

Overview

In some embodiments, service tags enable software and hardware components installed within a host system to be registered with a central system (e.g. a server or a service). In some embodiments, a service tag registration application is executed on a service tag registration client (ST-registration client). In some embodiments, the ST-registration client obtains a copy of a service tag registry (ST-registry) within one or more hosts systems. The ST-registration client then sends the data contained in the received ST-registries to the central system.

In some embodiments the central system includes a public/private key pair wherein the public key is distributed to the end hosts. In some embodiments, when the ST-registration client requests that an end host send its ST-registry contents to the ST-registration client, the end host generates a new symmetric key k, encrypts the contents of the ST-registry with k and k is encrypted with using the public key of the central system. Note that a symmetric key is typically a shared secret between two or more systems. Unlike a public-key encryption system, a symmetric key is typically not widely-distributed (e.g., it is not made available all computer systems). The end host then sends the encrypted data and the encrypted k to the ST-registration client.

In some embodiments, it is desirable for the ST-registration client be able to read the configuration information prior to forwarding it to the central system. In order to do so, the end host encrypts k with the public key of the ST-registration client. The ST-registration client can then request k from the end host and use its private key to decrypt the encrypted session key. The ST-registration client can then use the decrypted session key to decrypt the encrypted configuration information.

In some embodiments, the end host may not have a public key for a ST-registration client. Hence, it is desirable for the end host to remember if it is associated with an ST-registration client or not. In some embodiments, if the end host has the public key for a ST-registration client, the end host is associated with the ST-registration client. Otherwise, the end host it is not associated with the ST-registration client. In some embodiments, the public key for the ST-registration client can be installed manually (i.e., "touch") or supplied the first time the ST-registration client contacts the end host (i.e., "no touch"). The no-touch technique has the risk that a rogue registration client can install a public key that does not belong to a valid ST-registration client. In some embodiments, the risk can be mitigated by reducing the time window between ST software installation and first registration client invocation. The smaller that time window, the shorter the time in which this risk exists. Furthermore, since an ST-registration client can raise an alarm if a mismatch between a stored and presented public key is found, a rogue registration can readily be detected.

Obtaining Service Tags

FIG. 1 presents a block diagram illustrating a server 100, a service tag registration client (ST-registration client) 101, and an end host 108 in accordance with an embodiment of the present invention. In some embodiments end host 108 includes discovery agent 102, listener agent 103, service tag helper (ST-helper) 104, service tag registry (ST-registry) 105 and software component 106 and hardware component 107.

Server 100 can generally include any computational node including a mechanism for servicing requests from a client for computational and/or data storage resources. Server 100, ST-registration client 101 and end host 108 can be located at the same physical location (e.g., within the same building) or can be located at different physical locations. Similarly, server 100, ST-registration client 101 and end host 108 can be located on same network (e.g., the same corporate network) or can be located at different networks. Note that a network can generally include any type of wired or wireless communication channel capable of coupling together computing nodes. This includes, but is not limited to, a local area network, a wide area network, or a combination of networks. In some embodiments of the present invention, the networks can include the Internet. Furthermore, in some embodiments, server 100 can include one or more computer systems.

In some embodiments, discovery agent 102 listens for requests from ST-registration client 101 to send service tags for end host 108 to ST-registration client 101. Discovery agent 102 then responds by informing ST-registration client 101 at which port and with which protocol (e.g., TCP, UDP, etc.) on end host 108 to retrieve service tag information. In some embodiments, when ST registration client 101 contacts the appropriate port on end host 108, listener agent 103 receives the request and communicates with ST-helper 104.

In some embodiments, ST-helper 104 interacts with ST-registry 105, software component 106, and hardware component 107. ST-registry 105 can store one or more service tags for one or more software components and/or one or more hardware components. Note that a service tag includes configuration information for a given software or hardware component. Also note that any number of hardware and/or software components can be included in end host 108.

In some embodiments, a service tag can include a version number of one or more software packages installed on the first system; a version number of one or more hardware components installed on the first system; serial numbers for hardware components; serial numbers for software components; an operating system version number; firmware version numbers for hardware components; runtime instances of software components; and any other configuration information for an end host.

In some embodiments, ST-registry 105 is a database, which can include any type of system for storing data in non-volatile storage. This includes, but is not limited to, systems based upon magnetic, optical, and magneto-optical storage devices, as well as storage devices based on flash memory and/or battery-backed up memory.

FIGS. 2-6 illustrate an exemplary process for obtaining service tags from one or more end hosts in accordance with an embodiment of the present invention. Note that FIGS. 2-6 include elements similar to those described in FIG. 1. Hence, only elements that are not included in FIG. 1 are described with reference to FIGS. 2-6.

Figure 2:
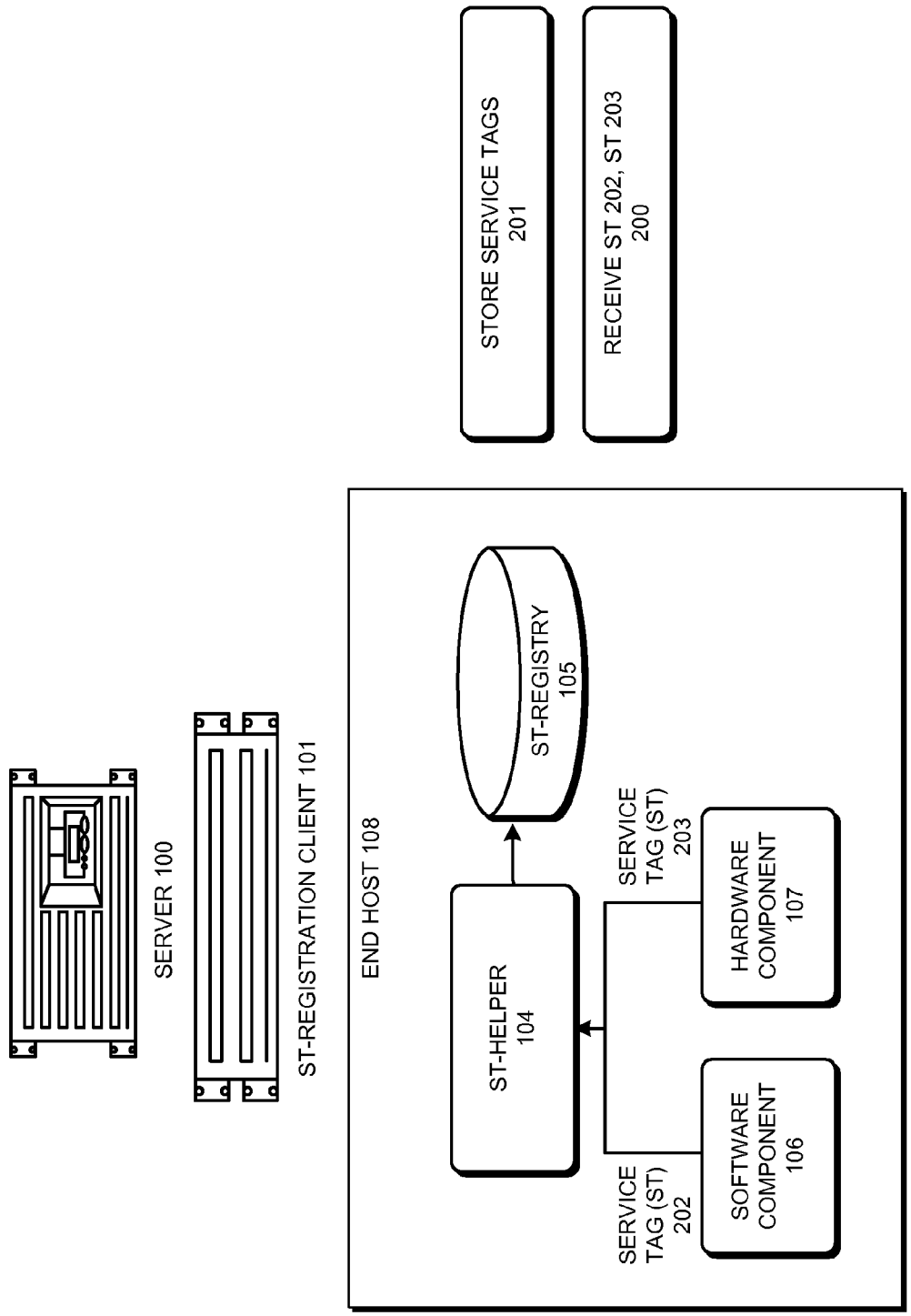
FIG. 2 presents a block diagram illustrating a process for storing service tags on an end host in accordance with an embodiment of the present invention.

FIG. 2 presents a block diagram illustrating a process for storing service tags on end host 108 in accordance with an embodiment of the present invention. ST-helper 104 receives service tags (ST) 202 from software component 106 and ST 203 from hardware component 107 (step 200). The received service tags can be in response to, but is not limited to, a request from ST-helper 104 to all software and hardware components within end host 108 to send service tags to ST-helper 104, an installation process for software component 106, an initial execution of a software component 106, and an initial boot-up process for hardware component 107. Note that ST-helper 104 can also receive service tags from one or more of software component, hardware components, or a combination of software and hardware components. ST-helper 104 then stores service tags (step 201) in ST-registry 105.

Figure 3:
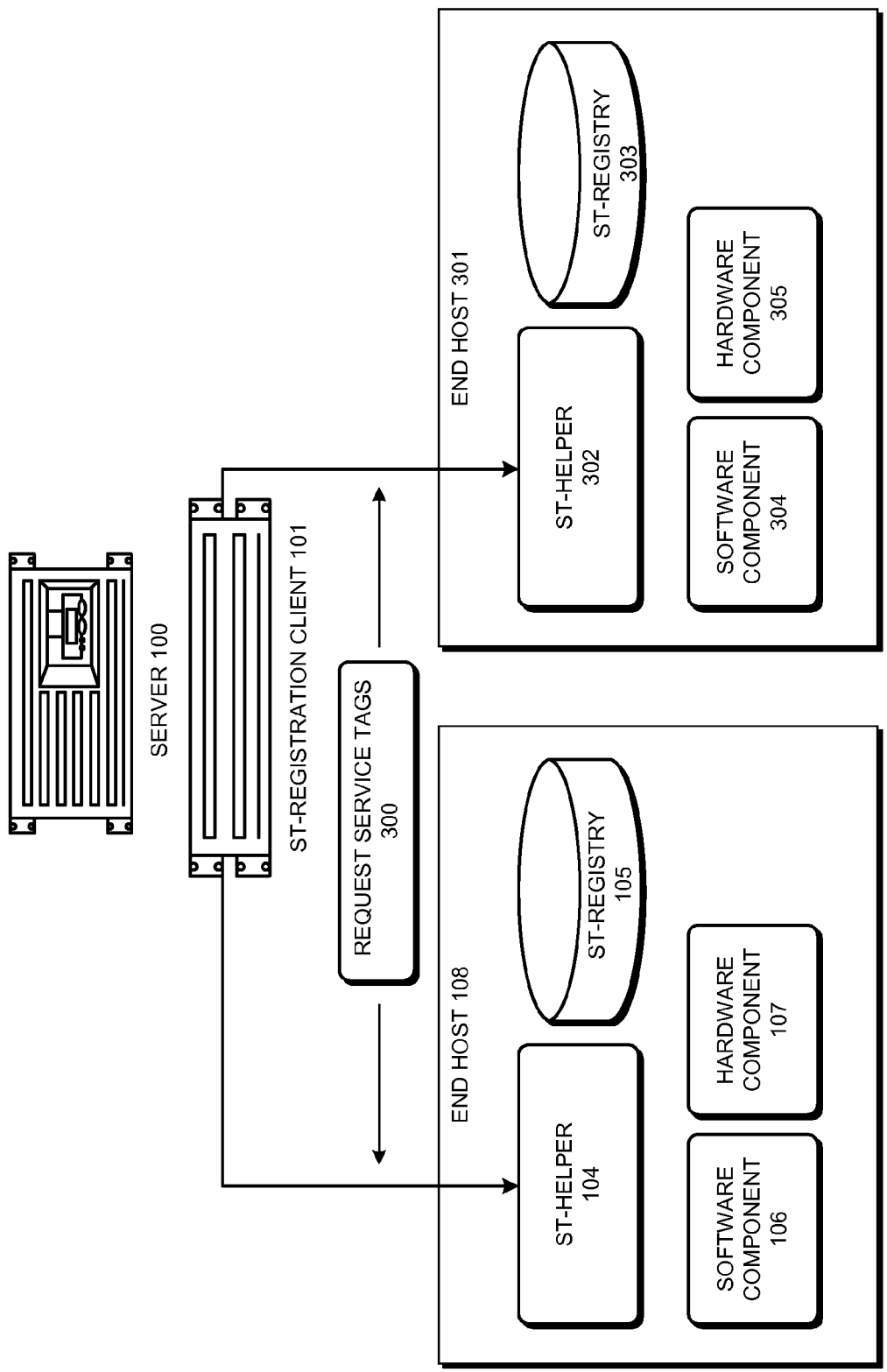
FIG. 3 presents a block diagram illustrating a process for requesting service tags from one or more end hosts in accordance with an embodiment of the present invention.

FIG. 3 presents a block diagram illustrating a process for requesting service tags from end hosts 108 and 301 in accordance with an embodiment of the present invention. FIG. 3 is similar to FIG. 1 except that FIG. 3 also includes end host 301, which includes ST-helper 302, ST-registry 303 and software component 304 and hardware component 305. Note that the components within end host 301 are similar to the components within end host 108. Also note that any number of hardware and/or software components can be included in a given end host. In FIG. 3, ST-registration client requests service tags (step 300) from end hosts 108 and 301. Note that ST-registration client 101 can request service tags from any number of end hosts.

Figure 4:
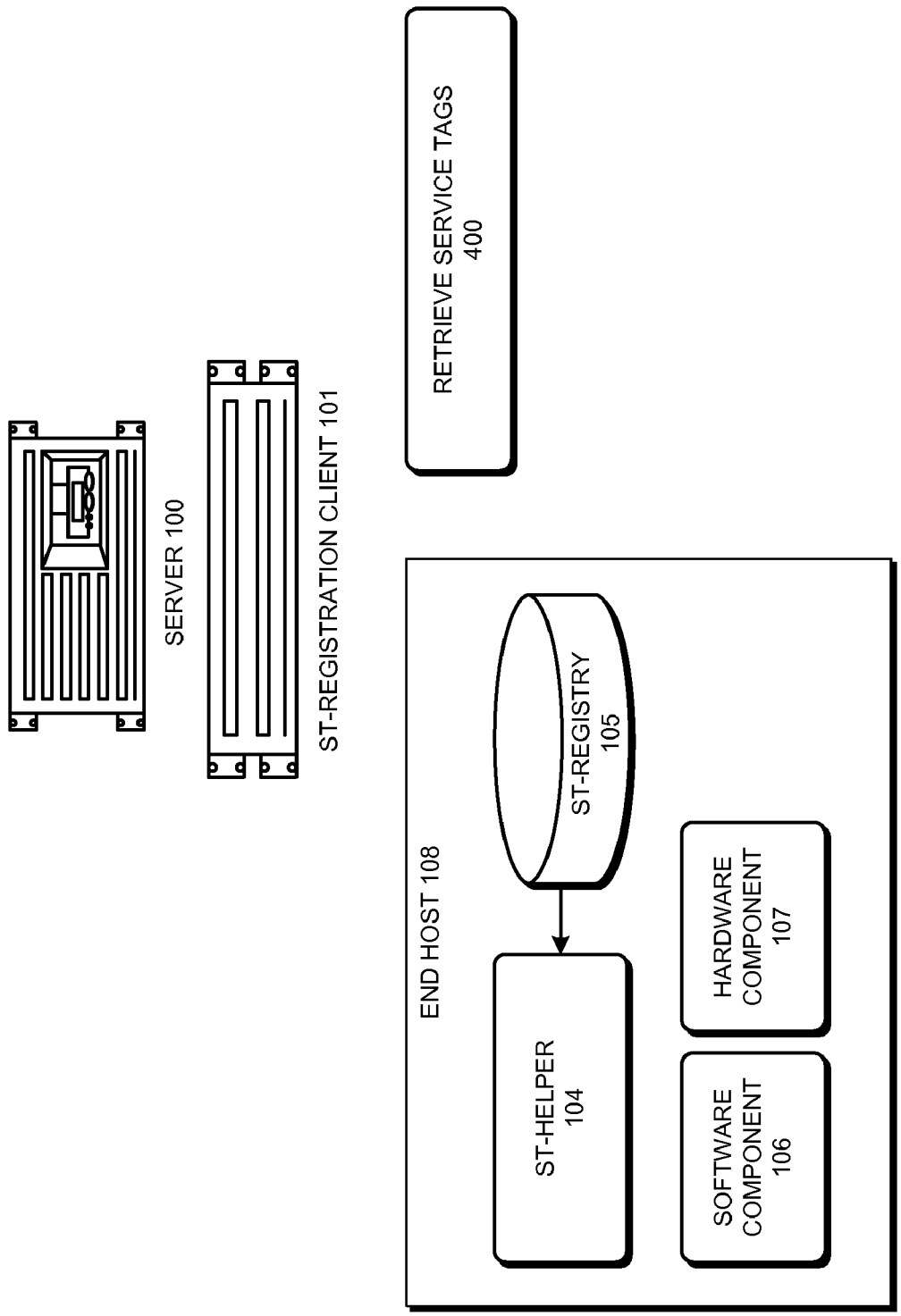
FIG. 4 presents a block diagram illustrating a process for retrieving service tags from a service tag registry (ST-registry) in accordance with an embodiment of the present invention.

In FIG. 4, ST-helper 104 retrieves service tags (step 400) from ST-registry 105. Similarly, this process is also performed at end host 301 and any other end hosts to which ST-registration client 101 made the request.

Figure 5:
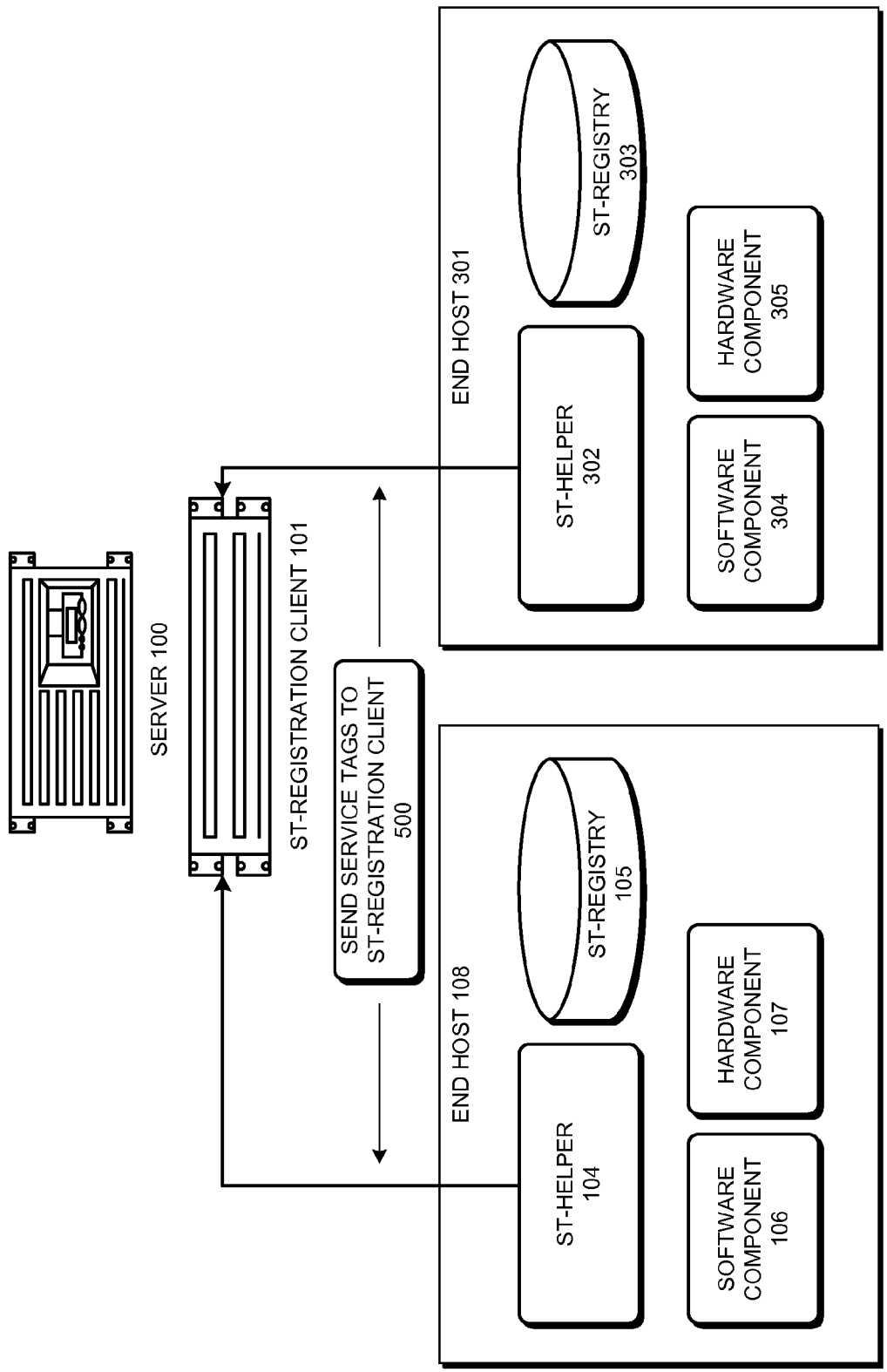
FIG. 5 presents a block diagram illustrating a process for sending service tags from one or more end hosts to an ST-registration client in accordance with an embodiment of the present invention.

FIG. 5 presents a block diagram illustrating a process for sending service tags from end hosts 108 and 301 to a ST-registration client 101 in accordance with an embodiment of the present invention. After ST-helpers 104 and 302 retrieve service tags from ST-registries 105 and 303, respectively, ST-helpers 104 and 302 send the retrieved service tags to ST-registration client 101 (step 500).

Figure 6:
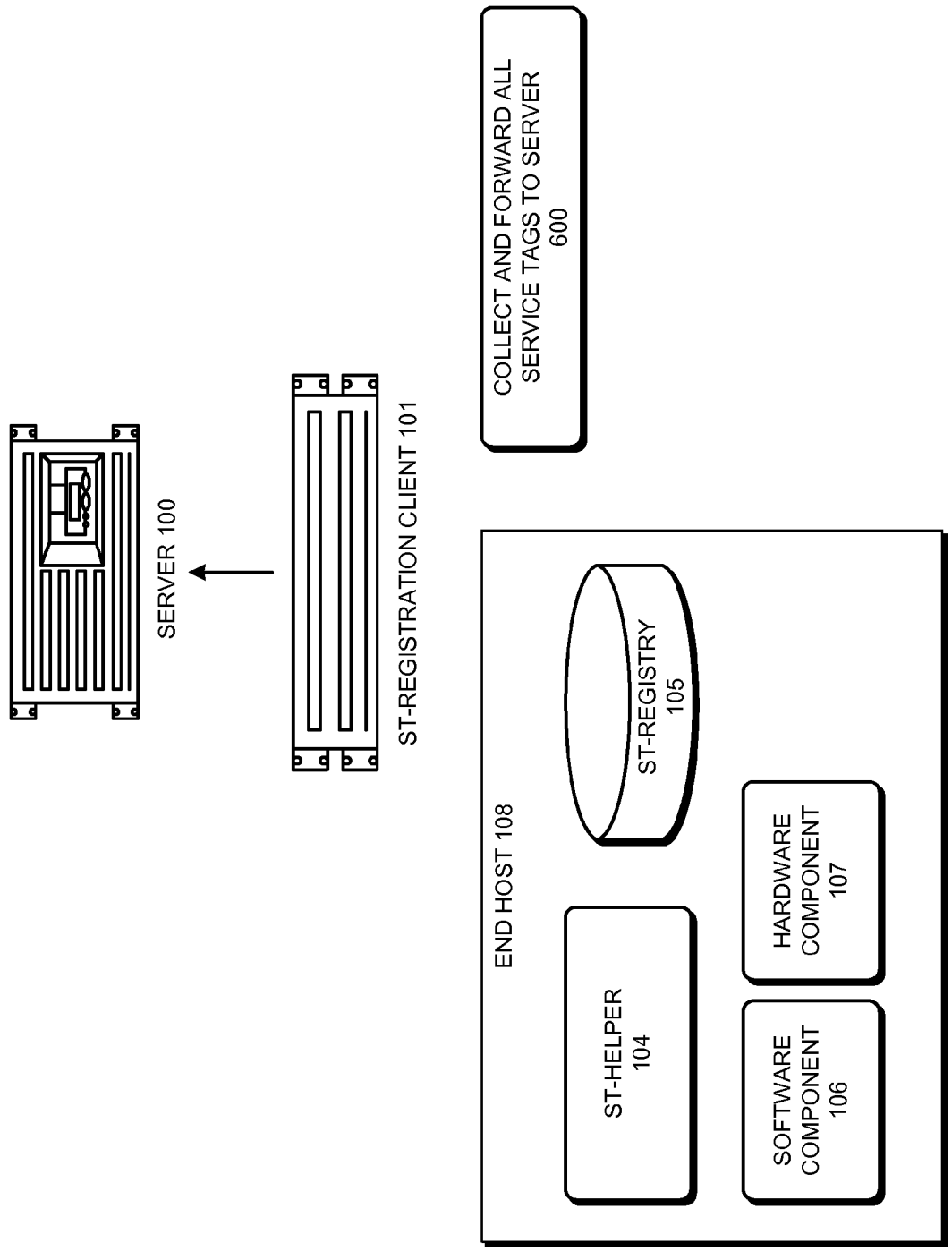
FIG. 6 presents a block diagram illustrating a process for sending service tags from a ST-registration client to a server in accordance with an embodiment of the present invention.

In FIG. 6, ST-registration client 101 collects and forwards all service tags to server 100 (step 600). Note that server 100 can collect service tags from one or more ST-registration clients. For example, server 100 can collect service tags for ST-registration clients located within a plurality of businesses.

The advantage of the above-described process for obtaining service tags is that it is a "no-touch" technique, wherein pre-installation of a trust-anchor (e.g., a security certificate) is not necessary. If a system claiming to be a ST-registration client requests service tags from an end host, the end host responds by sending the service tags to the ST-registration client. However, this process presents a possibility that a rogue ST-registration client can request and obtain service tags from end hosts. Hence, the rogue system can obtain information about software and hardware components on the end host. This information can then be used by the rogue system to determine whether security holes exist in the given software and hardware components within the end host system. If so, the rogue system can mount an attack on the end host. Hence, it is desirable to provide a no-touch technique for obtaining service tags without the above-described problem.

Securely Obtaining Service Tags

Figure 7:
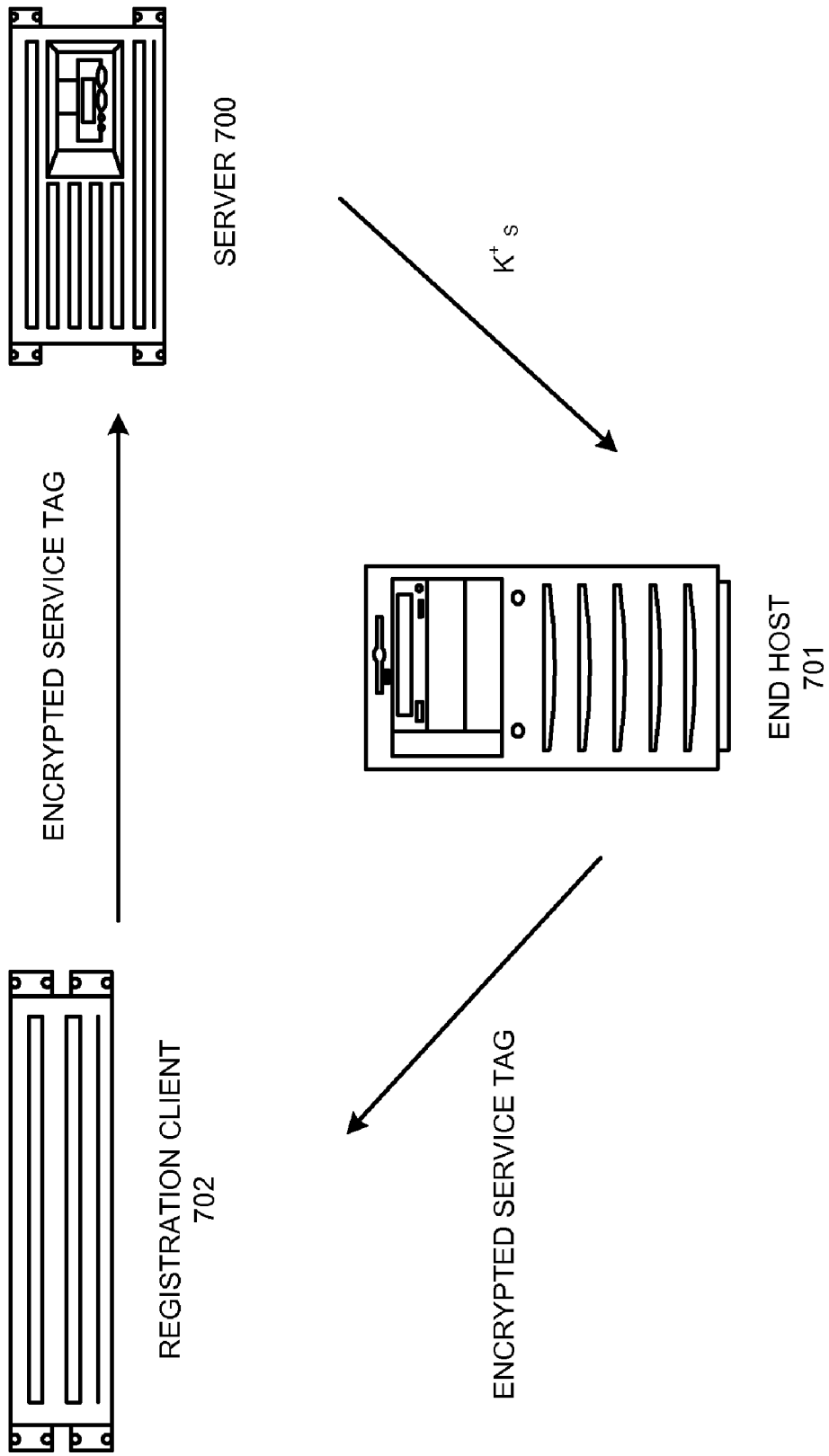
FIG. 7 presents a block diagram of another process for obtaining service tags from end hosts in accordance with an embodiment of the present invention.

FIG. 7 presents a block diagram of another process for obtaining service tags from end hosts in accordance with an embodiment of the present invention. FIG. 7 includes server 700 which sends a public key for server 700 ($k^+_S$) to end host 701. End host 701 then encrypts service tags using a session key k and encrypts the session key using $k^+_S$. End host 701 then sends the encrypted service tag to registration client 702. Registration client 702 then sends the encrypted service tag to server 700. FIGS. 8-13 illustrate this process in more detail.

Figure 8:
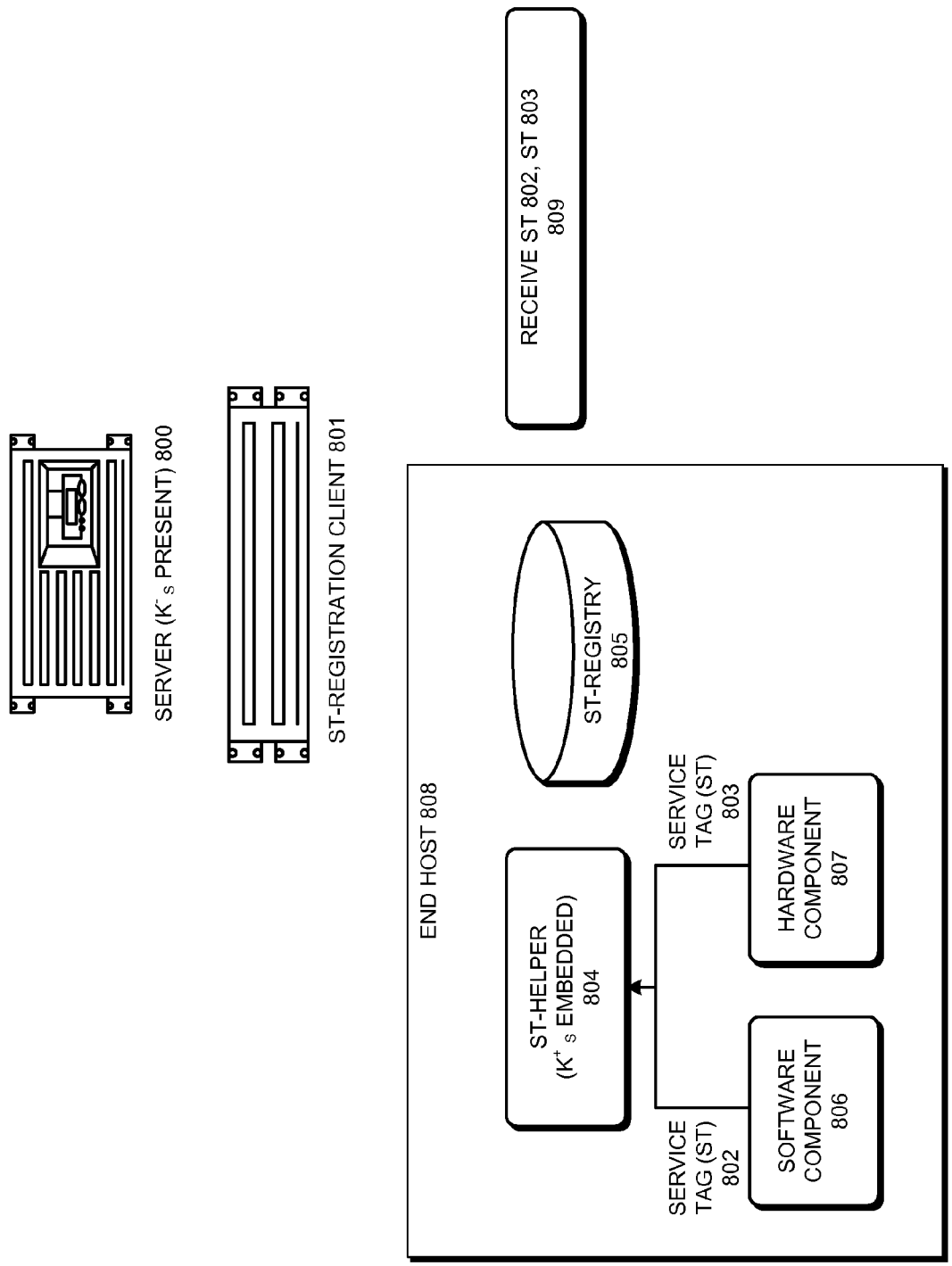
FIG. 8 presents a block diagram illustrating a process for registering service tags with a service tag helper (ST-helper) on an end host in accordance with an embodiment of the present invention.

FIG. 8 presents a block diagram illustrating a process for receiving service tags with a ST-helper on an end host in accordance with an embodiment of the present invention. FIG. 8 includes server 800, ST-registration client 801, and end host 808. In some embodiments, server 800 includes a private key $k^-_S$. End host 808 includes ST-helper 804, ST-registry 805, and software component 806 and hardware component 807. In some embodiments, ST-helper includes a public key $k^+_S$ for server 800. In FIG. 8, ST-helper 804 receives service tag 802 from software component 806 and service tag 803 from hardware component 807 (step 809). The received service tags can be in response to, but is not limited to, a request from ST-helper 804 to all software and hardware components within end host 808 to send service tags to ST-helper 804, an installation process for software component 806, an initial execution of a software component 806, and an initial boot-up process for hardware component 807. Note that ST-helper 804 can also receive service tags from one or more of software component, hardware components, or a combination of software and hardware components.

Figure 9:
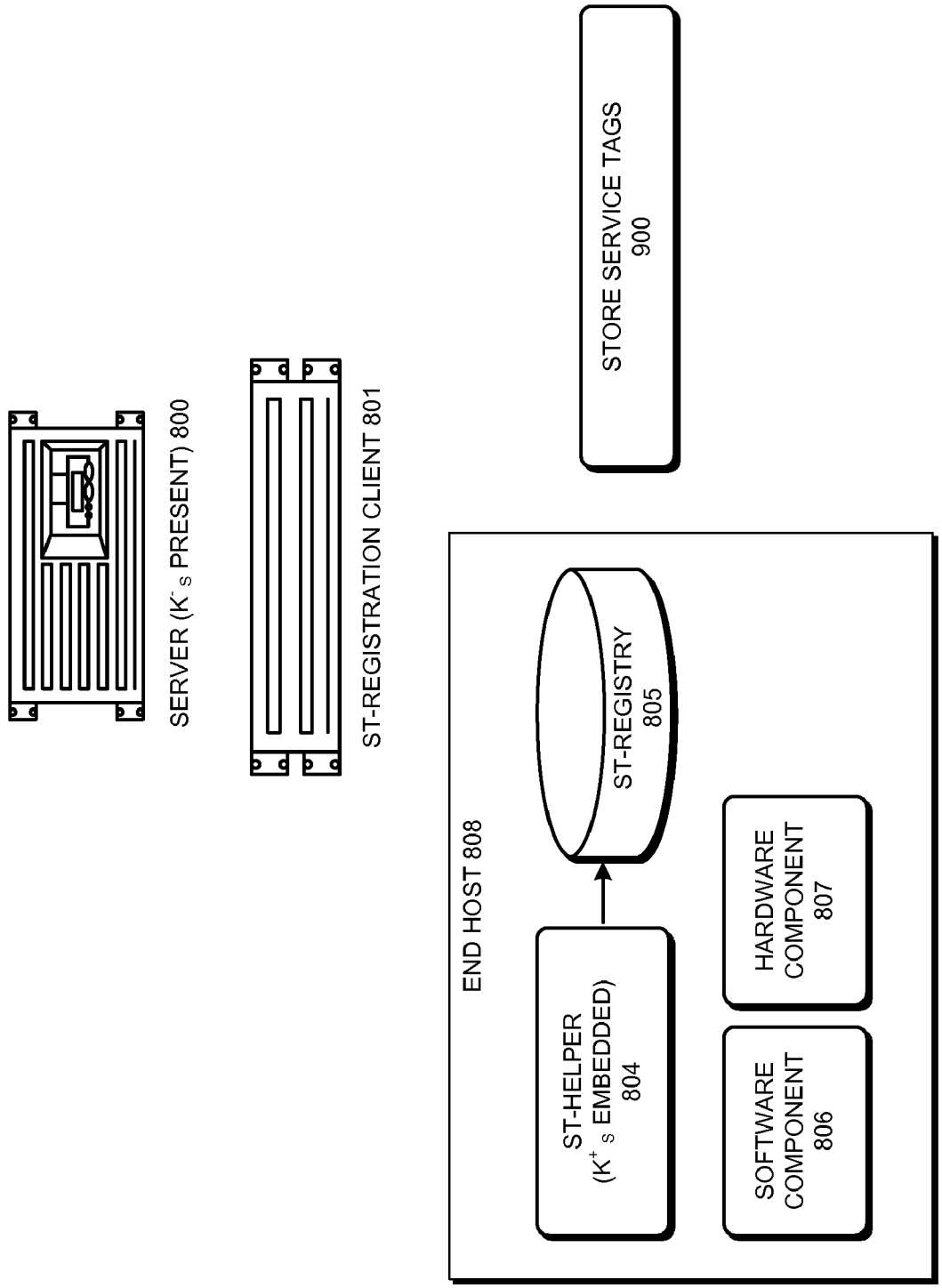
FIG. 9 presents a block diagram illustrating a process for receiving service tags within a ST-registry on an end host in accordance with an embodiment of the present invention.

In FIG. 9 ST-helper 804 stores service tags (step 900) in ST registry 805 within end host 808.

Figure 10:
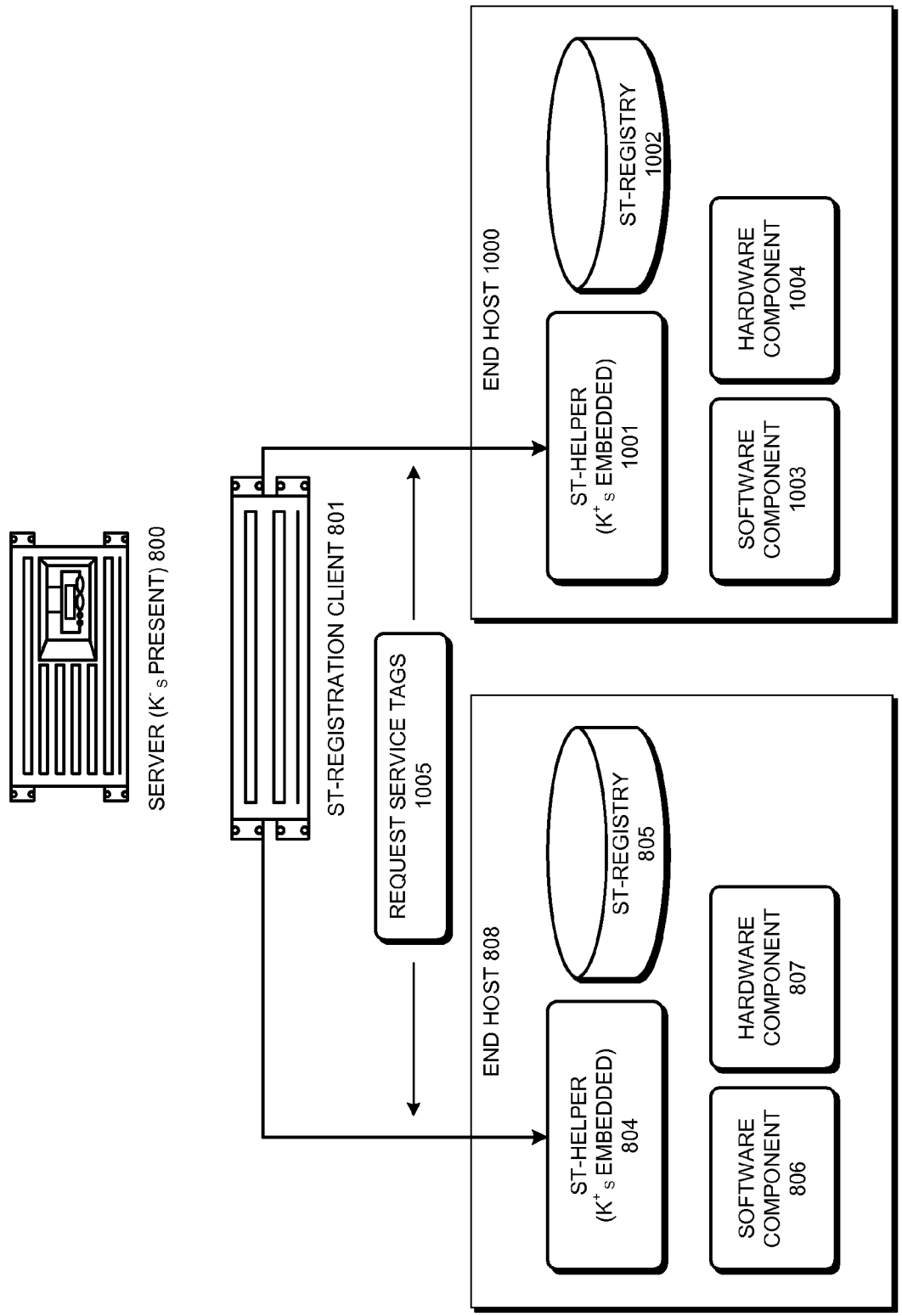
FIG. 10 presents a block diagram illustrating a process for requesting service tags from one or more end hosts in accordance with an embodiment of the present invention.

FIG. 10 presents a block diagram illustrating a process for requesting service tags from end hosts 808 and 1000 in accordance with an embodiment of the present invention. FIG. 10 is similar to FIG. 8 except that FIG. 10 also includes end host 1000, which includes ST-helper 1001, ST-registry 1002 and software component 1003 and hardware component 1004. The components within end host 1000 are similar to the components within end host 808. Note that any number of hardware and/or software components can be included in a given end host. In FIG. 10, ST-registration client requests service tags (step 1005) from end hosts 808 and 1000. Note that ST-registration client 801 can request service tags from any number of end hosts.

Figure 11:
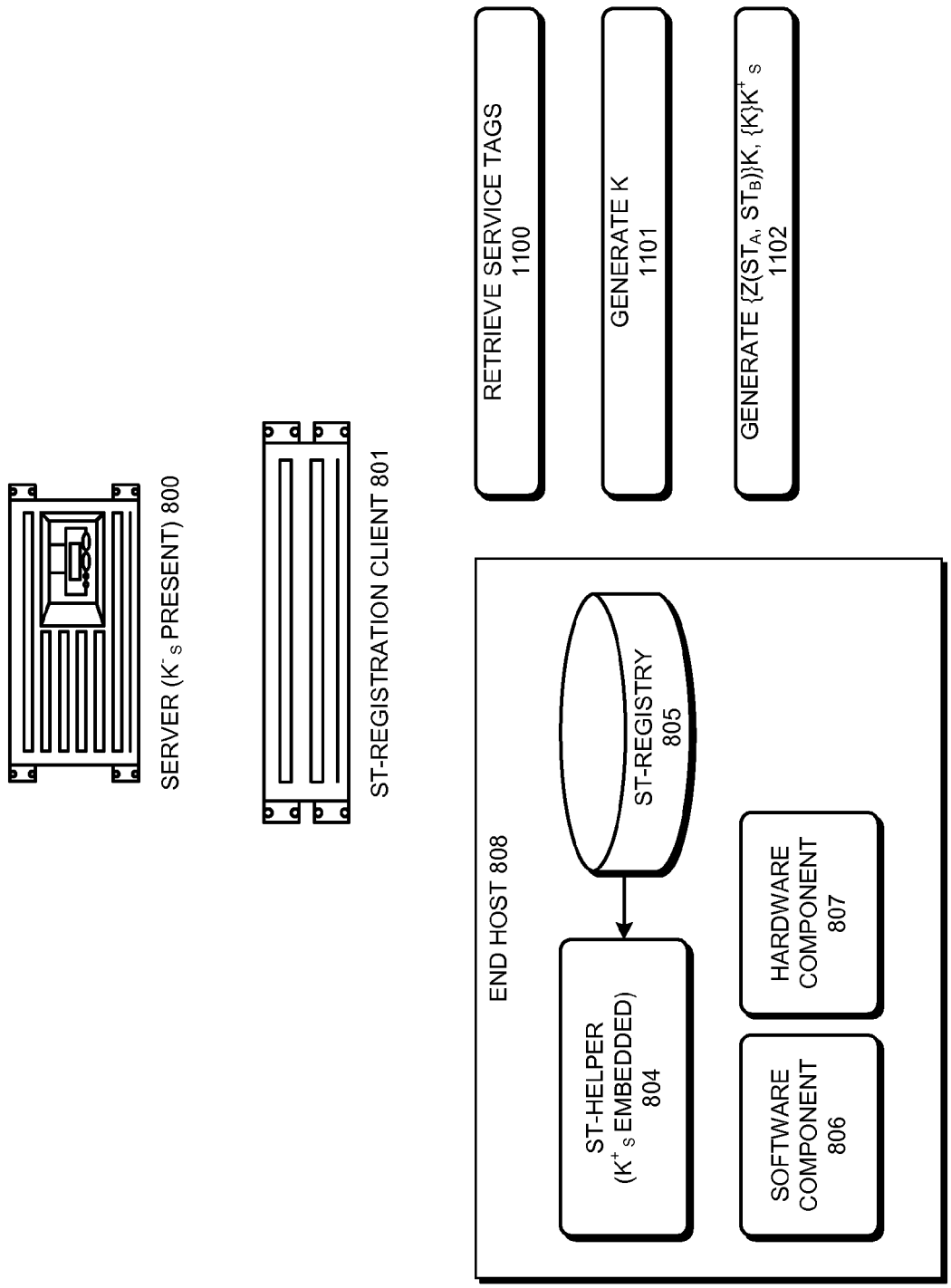
FIG. 11 presents a block diagram illustrating a process for generating service tags which are cryptographically opaque to a ST-registration client but which can be decrypted by a server in accordance with an embodiment of the present invention.

FIG. 11 presents a block diagram illustrating a process for generating service tags which are cryptographically opaque to a ST-registration client but which can be decrypted by a server in accordance with an embodiment of the present invention. Note that the term "cryptographically opaque" means that a system without a security credential associated with the cryptographically opaque configuration information cannot access the configuration information.

In FIG. 11, ST-helper 804 retrieves service tags (step 1100) from ST-registry 805. ST-helper 804 then generates a session key k (step 1101) and uses k to encrypt the retrieved service tags (step 1101) (i.e., $\{Z\ (ST_A, ST_B)\}k, \{k\}k^+_S$). In some embodiments, the service tags are compressed prior to being encrypted by the session key. In other embodiments, the service tags are not compressed. Similarly, this process is also performed at end host 1000 and any other end hosts to which ST-registration client 801 made the request.

Figure 12:
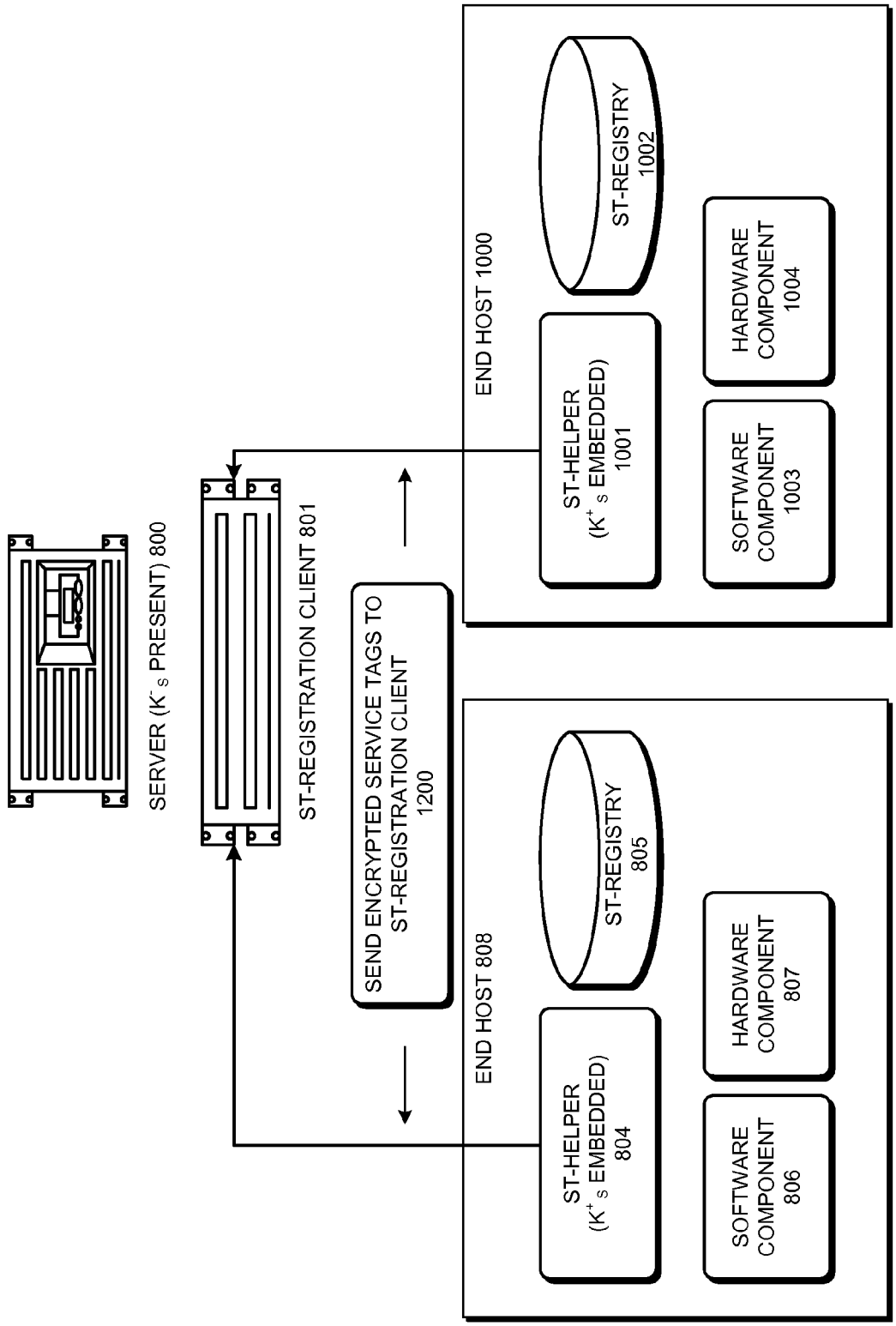
FIG. 12 presents a block diagram illustrating a process for sending encrypted service tags from one or more end hosts to a ST-registration client in accordance with an embodiment of the present invention.

FIG. 12 presents a block diagram illustrating a process for sending encrypted service tags from end hosts 808 and 1000 to ST-registration client 801 in accordance with an embodiment of the present invention. After ST-helpers 804 and 1001 retrieve service tags from ST-registries 805 and 1002, respectively, ST-helpers 804 and 1001 send the retrieved service tags to ST-registration client 801 (step 1200).

Figure 13:
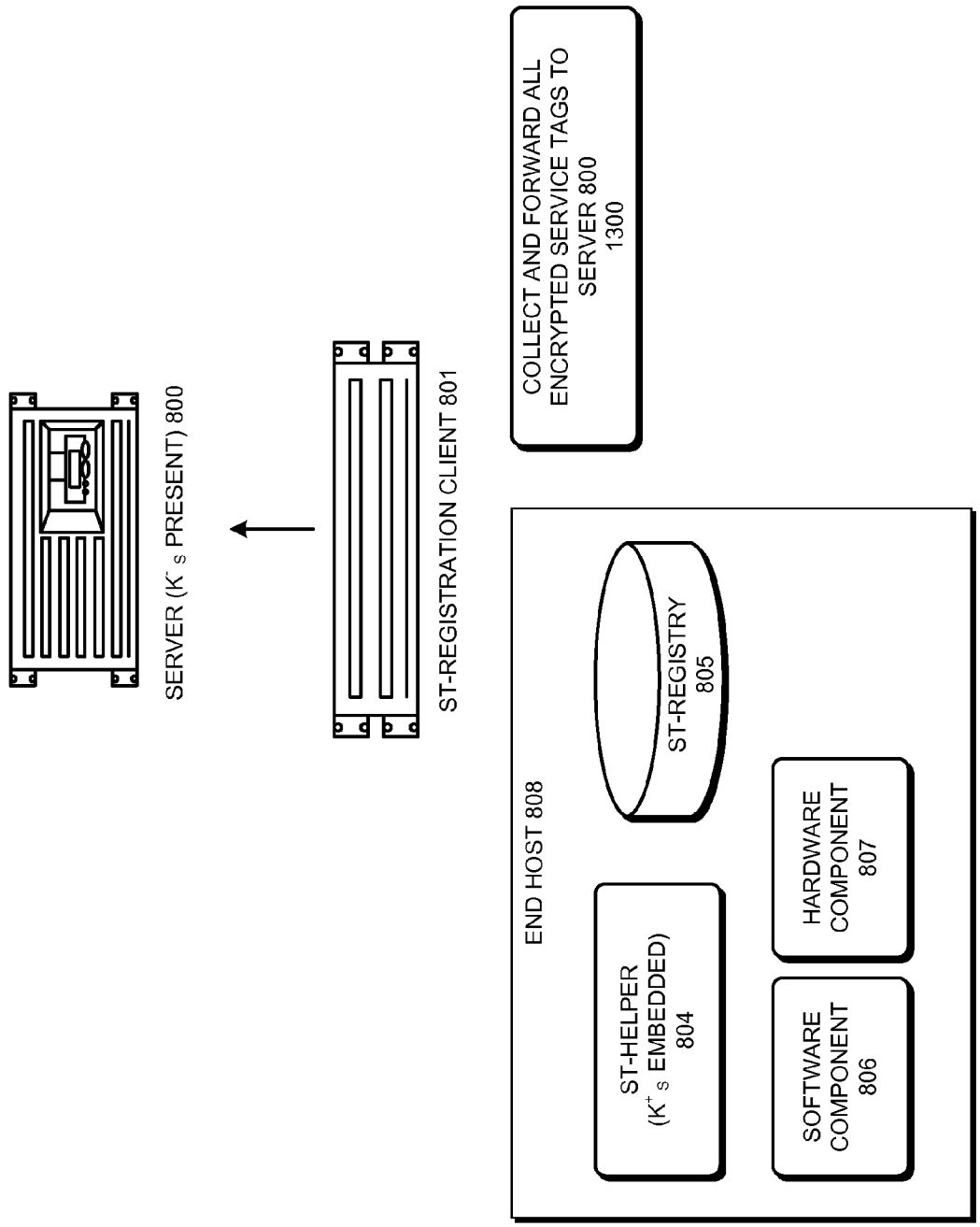
FIG. 13 presents a block diagram illustrating a process for sending service tags from an ST-registration client to a server in accordance with an embodiment of the present invention.

FIG. 13 presents a block diagram illustrating a process for sending service tags from ST-registration client 801 to server 800 in accordance with an embodiment of the present invention. ST-registration client 801 collects and forwards all service tags to server 800 (step 1300). In some embodiments, server 800 has encrypted service tags and has the corresponding session key which was encrypted using a public key for server 800. Hence, server 800 can decrypt the encrypted session key using the private key for server 800. System 800 can then decrypt the encrypted service tags using the decrypted session key to extract the service tags.

Note that server 800 can collect service tags from a number of ST-registration clients. For example, server 800 can collect service tags from ST-registration clients located within a plurality of businesses.

FIG. 14 presents a flow chart illustrating the process of securely sending configuration information for a first system to a second system in accordance with an embodiment of the present invention. The process begins when the system receives a request at the first system from an intermediary system to obtain configuration information for the first system (step 1400). In response to the request, the system encrypts configuration information for the first system using a first encryption key (step 1402). Next, the system encrypts the first encryption key using a second encryption key (step 1404). The system then sends the encrypted configuration information and the encrypted first encryption key to the intermediary system so that the intermediary system can forward the encrypted configuration information and the encrypted first encryption key to the second system (step 1406), wherein the content of the encrypted configuration information is cryptographically opaque to the intermediary system.

FIG. 15 presents a flow chart illustrating the process of obtaining configuration information at the first system in accordance with an embodiment of the present invention. The process begins when the system determines at the first system the configuration information for one or more components within the first system (step 1500). The system then stores the configuration information for the one or more components in a database within the first system (step 1502).

Figure 16:
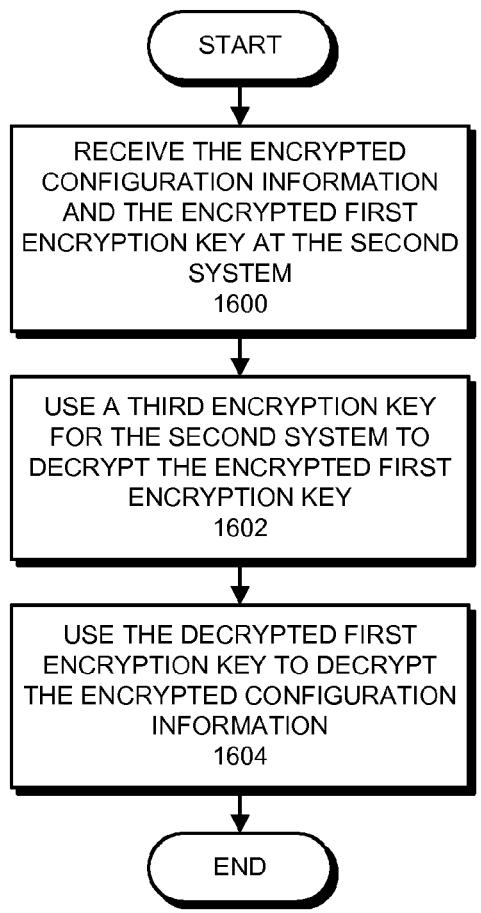
FIG. 16 presents a flow chart illustrating the process of obtaining configuration information at the first system in accordance with an embodiment of the present invention.

FIG. 16 presents a flow chart illustrating the process of obtaining configuration information at the first system in accordance with an embodiment of the present invention. The process begins when the system receives the encrypted configuration information and the encrypted first encryption key at the second system (step 1600). Next the system uses a third encryption key for the second system to decrypt the encrypted first encryption key (step 1602). The system then uses the decrypted first encryption key to decrypt the encrypted configuration information (step 1604). In some embodiments, wherein the second encryption key is a public encryption key for the second system and the third encryption key is a private encryption key associated with the second encryption key.

Figure 17:
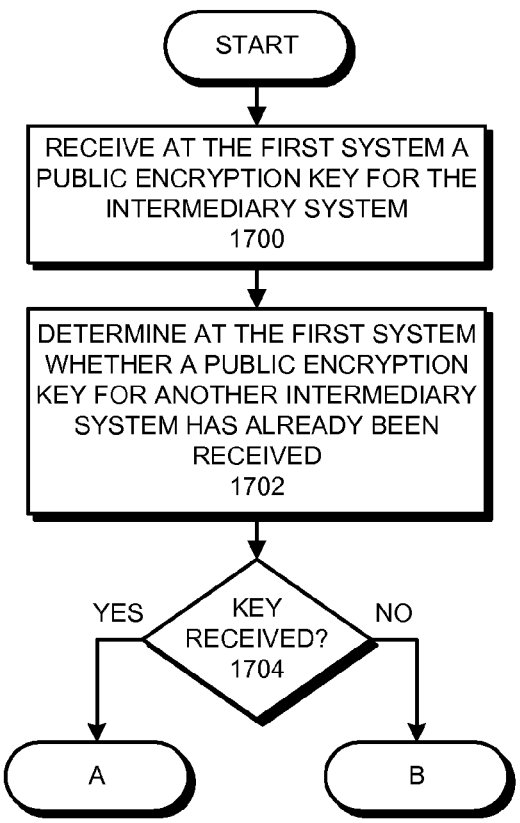
FIG. 17 presents a flow chart illustrating the process of determining whether an intermediary system has been associated with a first system in accordance with an embodiment of the present invention.

FIG. 17 presents a flow chart illustrating the process of determining whether an intermediary system has been associated with a first system in accordance with an embodiment of the present invention. The process begins when the system receives at the first system a public encryption key for the intermediary system (step 1700). The system then determines at the first system whether a public encryption key for another intermediary system has already been received (step 1702). If so (step 1704, yes), the process continues at A in FIG. 18. Otherwise (step 1704, no), the process continues at B in FIG. 19.

Figure 18:
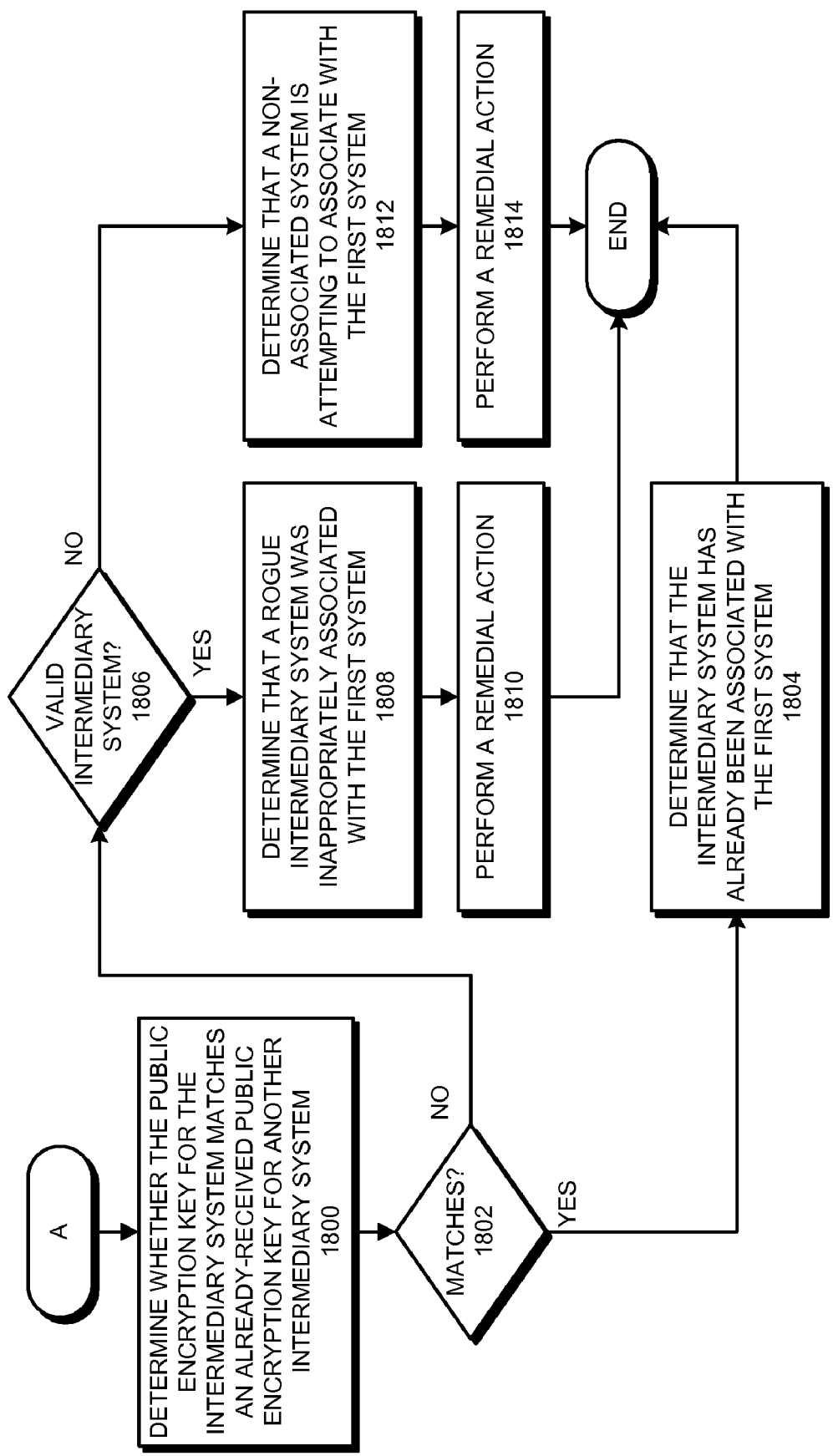
FIG. 18 continues the process illustrated in FIG. 17 wherein the public encryption key for another intermediary system has already been received in accordance with an embodiment of the present invention.

FIG. 18 continues the process illustrated in FIG. 17 wherein the public encryption key for another intermediary system has already been received in accordance with an embodiment of the present invention. The process begins when the system determines whether the public encryption key for the intermediary system matches an already-received public encryption key for another intermediary system (step 1800). If so (step 1802, yes), the system determines that the intermediary system has already been associated with the first system (step 1804). If the public encryption key for the intermediary system does not match an already-received public encryption key for another system (step 1802, no) and if the intermediary system is a valid intermediary system (step 1806, yes), the system determines that a rogue intermediary system was inappropriately associated with the first system (step 1808). The system then performs a remedial action (step 1810). For example, the system can notify an administrator, generate a warning in a log file, abort the transaction, or any other remedial action. If the public encryption key for the intermediary system does not match an already-received public encryption key for another system (step 1802, no) and if the intermediary system is not a valid intermediary system (step 1806, yes), the system determines that a non-associated system is attempting to associate with the first system (step 1812). The system then performs a remedial action (step 1814). For example, the system can notify an administrator, generate a warning in a log file, abort the transaction, or any other remedial action.

Figure 19:
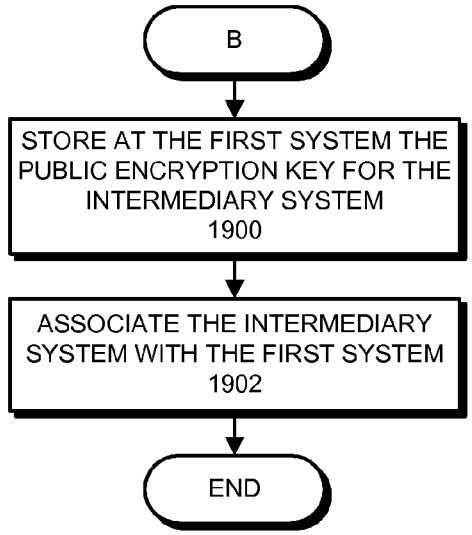
FIG. 19 continues the process illustrated in FIG. 17 wherein the public encryption key for another intermediary system has not been received in accordance with an embodiment of the present invention.

FIG. 19 continues the process illustrated in FIG. 17 wherein the public encryption key for another intermediary system has not been received in accordance with an embodiment of the present invention. The process begins when the system stores at the first system the public encryption key for the intermediary system (step 1900). The system then associates the intermediary system with the first system (step 1902).

Figure 20:
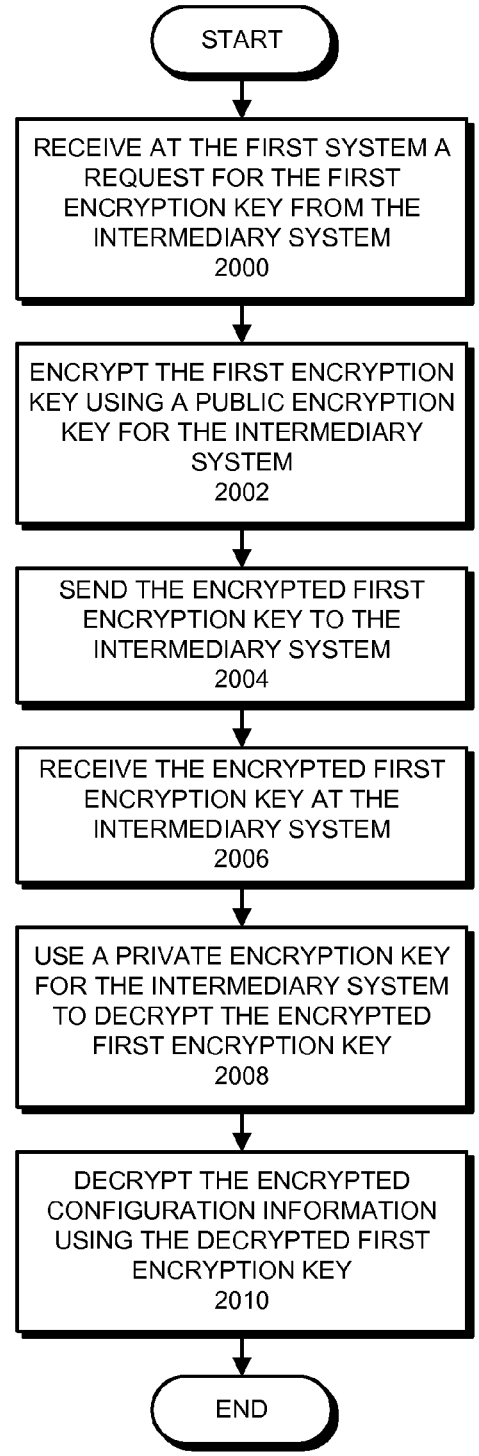
FIG. 20 presents a flow chart illustrating the process of allowing an intermediary system to verify the configuration information in accordance with an embodiment of the present invention.

FIG. 20 presents a flow chart illustrating the process of allowing an intermediary system to verify the configuration information in accordance with an embodiment of the present invention. The process begins when the system receives at the first system a request for the first encryption key from the intermediary system (step 2000). In response to the request, the system encrypts the first encryption key using a public encryption key for the intermediary system (step 2002). Next, the system sends the encrypted first encryption key to the intermediary system (step 2004). The system then receives the encrypted first encryption key at the intermediary system (step 2006). Next, the system uses a private encryption key for the intermediary system to decrypt the encrypted first encryption key (step 2008). The system then decrypts the encrypted configuration information using the decrypted first encryption key (step 2010). In some embodiments, if the configuration information is compressed, the system decompresses the decrypted compressed configuration information.

Exemplary Implementation

The following conventions are used in the exemplary implementation below.

- k: a key which can be a symmetric key or a public/private key
- $k^+_A$: public part of a public/private key belonging to system A
- $k^-_A$: private part of a public/private key belonging to system A
- $\{m\}k$ : message m encrypted with key k
- $m_{(i)}$: $i^{th}$ message that's part of the protocol exchange
- H( ): some cryptographically strong hash function (e.g., SHA1)
- $h_x$: hash value, further identified with index x Service Tag Creation Phase In some embodiments, the service tag creation phase is executed once for each software and/or hardware component being installed on a host system H. A new service tag $st_i$ is created for each software and/or hardware component within H and the service tag is registered it with H (e.g., using an application programming interface). H then stores the new service tag in the clear into its ST-Registry-database Service Tag Registry Request/Response Phase In some embodiments, the service tag registry request/response phase is executed once for each host system (e.g., OS instance) that contains a service tag registry (ST-Registry).

In some embodiments, a registration client C creates a nonce (i.e., a number which is used only once). Next, C signs the nonce and its public key $k^+_C$. C then calculates a hash value $h=\{H(nonce, k^+_C)\}k^-_C$.

In some embodiments, C formats and sends a message $m_{(1)}=(REQUEST\_ST\-REG\-DB, k^+_C, nonce, h)$ to H, where REQUEST_ST-REG-DB is a command which instructs a host system to send service tags to the C.

H then receives $m_{(1)}'$, where $m_{(1)}'$ indicates that the message may not be a message sent from a valid registration client C (the validness of the message is determined below).

In some embodiments, H can be in one of two states: affiliated or unaffiliated. If H is in an affiliated state, then H has previously stored a public key $K^+_C$ for a registration client C. If H is in an unaffiliated state, then H has not previously stored a public key $K^+_C$ for a registration client C.

In some embodiments, if H is in an affiliated state, H aborts the communication with C if the received public key $k^-_C{'}$ does not equal the $k^+_C$ that was previously stored.

In some embodiments, if H is in an unaffiliated state, H stores the received public key $k^+_C{'}$ and enters an affiliated state wherein H is affiliated with the registration client C whose public key is $k^+_C{'}$.

In some embodiments, H generates fresh symmetric key k for each request from a registration client. Next, H encrypts k using the public key for C (i.e., $\{k\}k^+_C$) and stores it locally for C to validate the encrypted content. H then encrypts k using the public key for the server (i.e., $\{k\}k^+_S$). Next, H retrieves the service tags from the service tags (ST) registry database (ST-DB).

In some embodiments, H compresses the retrieved service tags (i.e., Z(ST-DB)). H then encrypts the compressed ST-DB contents with k (i.e., $\{Z(ST\text{-}DB)\}k$).

In some embodiments, H formats and sends $m_{(2)}$=(REPLY_ST-REG-DB, $\{Z(ST\text{-}DB)\}k$, $\{k\}k^+_S$, nonce, h). Next, C receives $m_{(2)}$'. C aborts the transaction with H if the received value h'≠$\{H(nonce', k^+_C)\}k^-_C$. C also aborts the transaction with H if the received nonce' is not fresh (e.g., not within a specified time period after the message was generated).

Note that C can collects a number of received tuples ($\{Z(ST\text{-}DB)\}k$, $\{k\}k^+_S$).

Optional Examination Phase

In some embodiments, C can examine the encrypted service tag data received from H. C retrieves a stored encrypted symmetric key $\{k\}k^+_C$ from H out-of-band. Next, C formats and sends $m_{(a)}$=(REQUEST_K). H then formats and sends $m_{(b)}$=(REPLY-K, $\{k\}k^+_S$). In some embodiments, C first authenticates itself with H before H sends C the encrypted session key $\{k\}k^+_C$. If C is a valid registration client, then H sends $\{k\}k^+_C$ to C.

In some embodiments, after receiving the session key from H, C can examine the contents of each collected $\{Z(ST\text{-}DB)\}k$ prior to uploading the service tags to S, because C can recover the key k using C's private key $k^-_C$ as follows: (1) C recovers the session key k from $\{k\}k^+_C$; (2) C decrypts $\{Z(ST\text{-}DB)\}k$ with k; (3) C calculates decompression of Z(ST-DB); and (4) C presents ST-DB to an administrator who can review the contents of ST-DB and uploaded ST-DB to S.

Service Tag Upload Phase

In some embodiments, after C receives service tags from H (or a number of end hosts), C uploads the service tags to S (e.g., C sends $m_{(3)}$=(UPLOAD_ST-DBS, [$\{Z(ST\text{-}DB)\}k^+_S$])). S can then retrieve the contents of the received $\{Z(ST\text{-}DB)\}k$ because S can recover the key k by decrypting the received values $\{k\}^+_S$ using its private key $k^-_S$.

Discussion

In some embodiments, $m_{(1)}$ and $m_{(2)}$ are sent are sent once for each leaf node (unless there is packet loss/corruption, etc.).

In some embodiments, $m_{(3)}$ is sent once for each registration (unless there is packet loss/corruption, etc.).

The above-described exemplary implementation substantially minimizes the interaction with S, making the architecture scalable. Furthermore, the above-described exemplary implementation protects against replay attacks by using nonces for challenge messages and challenge responses. If a message is modified by an active eavesdropper in any way, it can be detected.

In some embodiments, the above-described exemplary implementation is stateless at all nodes except for the nonces that protect against replay attacks. However, if a local clock value is used as the nonce (i.e., no globally synchronized clock is used), the above-described exemplary implementation is completely stateless. Hence, the above-described exemplary implementation can protect all participants against a memory resource denial of service attack (e.g., SYN flooding).

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for securely registering components in a first system, comprising:
   receiving a request at the first system from an intermediary system to obtain configuration information related to the components in the first system;
   in response to the request,
   encrypting configuration information for the first system using a first encryption key;
   encrypting the first encryption key using a second encryption key;
   sending the encrypted configuration information and the encrypted first encryption key to the intermediary system so that the intermediary system can forward the encrypted configuration information and the encrypted first encryption key to the second system, whereby the encrypted configuration information is cryptographically opaque to the intermediary system; and
   allowing the second system to use the configuration information to register the components in the first system.

2. The method of claim 1, wherein the configuration information can include one or more of:
   a version number of one or more software packages installed on the first system;
   a version number of one or more hardware components installed on the first system;
   serial numbers for hardware components;
   serial numbers for software components;
   an operating system version number;
   firmware version numbers for hardware components;
   runtime instances of software components; and
   any other configuration information for a system.

3. The method of claim 1, wherein the first encryption key is a session key generated by the first system.

4. The method of claim 3, wherein a new session key is generated for each request from an intermediary system to obtain configuration information.

5. The method of claim 3, wherein the session key is a symmetric encryption key.

6. The method of claim 1, wherein the second encryption key is a public encryption key for second system.

7. The method of claim 1, wherein prior to encrypting the configuration information for the first system, the method further comprises:
   determining at the first system the configuration information for one or more components within the first system; and
   storing the configuration information for the one or more components in a database within the first system.

8. The method of claim 1, wherein the components can include one or more of:
   hardware components; and
   software components.

9. The method of claim 1, wherein prior to encrypting configuration information, the method further comprises compressing the configuration information.

10. The method of claim 1, further comprising:
    receiving the encrypted configuration information and the encrypted first encryption key at the second system;
    using a third encryption key for the second system to decrypt the encrypted first encryption key; and
    using the decrypted first encryption key to decrypt the encrypted configuration information.

11. The method of claim 10,
wherein the second encryption key is a public encryption key for the second system; and
wherein the third encryption key is a private encryption key associated with the second encryption key.

12. The method of claim 10, further comprising storing the decrypted configuration information in a database within the second system.

13. The method of claim 1, wherein prior to responding to the request from the intermediary system, the method further comprises:
receiving at the first system a public encryption key for the intermediary system; and
determining at the first system whether a public encryption key for another intermediary system has already been received.

14. The method of claim 13, wherein if the public encryption key for another intermediary system has already been received, the method further comprises:
determining whether the public encryption key for the intermediary system matches an already-received public encryption key for another intermediary system; and
if so, determining that the intermediary system has already been associated with the first system.

15. The method of claim 14, wherein if the public encryption key for the intermediary system does not match an already-received public encryption key for another system and if the intermediary system is a valid intermediary system, the method further comprises:
determining that a rogue intermediary system was inappropriately associated with the first system; and
performing a remedial action.

16. The method of claim 13, wherein if the public encryption key for another intermediary system has not been received, the method further comprises:
storing at the first system the public encryption key for the intermediary system; and
associating the intermediary system with the first system.

17. The method of claim 1, further comprising:
receiving at the first system a request for the first encryption key from the intermediary system;
in response to the request,
encrypting the first encryption key using a public encryption key for the intermediary system; and
sending the encrypted first encryption key to the intermediary system;
receiving the encrypted first encryption key at the intermediary system;
using a private encryption key for the intermediary system to decrypt the encrypted first encryption key; and
decrypting the encrypted configuration information using the decrypted first encryption key.

18. The method of claim 17, wherein if the configuration information is compressed, the method further comprises decompressing the decrypted compressed configuration information.

19. The method of claim 1, wherein the method further comprises using challenge messages and challenge responses during communications between the first system, the second system, and the intermediary system.

20. The method of claim 19, wherein the challenge messages and/or challenge responses include one or more of:
nonces; and
hash values which include the nonces.

21. The method of claim 20, wherein the challenge message and challenge responses can be used to detect replay attacks.

22. A non-transitory computer-readable storage medium storing instructions that when executed by a computer cause the computer to perform a method for securely registering components in a first system, wherein the method comprises:
receiving a request at the first system from an intermediary system to obtain configuration information related to the components in the first system;
in response to the request,
encrypting configuration information for the first system using a first encryption key;
encrypting the first encryption key using a second encryption key;
sending the encrypted configuration information and the encrypted first encryption key to the intermediary system so that the intermediary system can forward the encrypted configuration information and the encrypted first encryption key to the second system, whereby the encrypted configuration information is cryptographically opaque to the intermediary system; and
allowing the second system to use the configuration information to register the components in the first system.

23. A system for securely registering components in a first system, comprising:
the first system including one or more software packages and one or more hardware components;
wherein the first system is configured to:
receive a request from an intermediary system to obtain configuration information for the first system;
encrypt configuration information related to the components in the first system using a first encryption key;
encrypt the first encryption key using a second encryption key;
send the encrypted configuration information and the encrypted first encryption key to the intermediary system so that the intermediary system can forward the encrypted configuration information and the encrypted first encryption key to the second system, whereby the encrypted configuration information is cryptographically opaque to the intermediary system, and
allowing the second system to use the configuration information to register the components in the first system.

* * * * *

UNITED STATES PATENT AND TRADEMARK OFFICE
CERTIFICATE OF CORRECTION

PATENT NO.         : 8,064,606 B2
APPLICATION NO.    : 11/939416
DATED              : November 22, 2011
INVENTOR(S)        : Christoph L. Schuba et al.

It is certified that error appears in the above-identified patent and that said Letters Patent is hereby corrected as shown below:

On the title page of the patent, please replace the third inventor's name, "Daniel E. Smith", with --Daniel F. Smith--.

Signed and Sealed this
Twenty-fourth Day of January, 2012

David J. Kappos
*Director of the United States Patent and Trademark Office*